United States Patent Office 3,591,615
Patented July 6, 1971

---

3,591,615
CHLOROPHENYL THIOTRICYCLOHEXYLTIN COMPOUNDS
Donald E. Bublitz, Concord, Calif., assignor to The Dow Chemical Company, Midland, Mich.
No Drawing. Filed Sept. 20, 1968, Ser. No. 761,312
Int. Cl. A01n 9/00; C07f 7/22
U.S. Cl. 260—429.7          1 Claim

ABSTRACT OF THE DISCLOSURE

Novel tricyclohexyltin thio-ethers, i.e. phenylthiotricyclohexyltin and chlorophenylthiotricyclohexyltin which are useful as pesticides.

---

The present invention relates to novel and useful tricyclohexyltin thio-ethers. More specifically, the present invention is directed to the compounds phenylthiotricyclohexyltin and chlorophenylthiotricyclohexyltin.

In the present specification and claim, the term "chlorophenyl" denotes a group represented by the formula

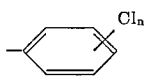

wherein $n$ is the integer 1, 2, 3, 4, or 5. Examples of such groups include 2-chlorophenyl, 2,4-dichlorophenyl, 2,4,5-trichlorophenyl, 2,3,5,6-tetrachlorophenyl, and pentachlorophenyl. The chlorophenylthiotricyclohexyltin compounds of the present invention thus correspond to the formula

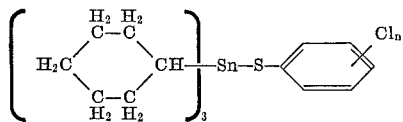

The compounds of the present invention are oily liquids or crystalline solids at room temperature. They are useful as pesticides for the control of a wide variety of arachnid, fungal, plant, and insect pests, for example, mites, ticks, the causative agents of apple scab and potato late blight, pigweeds, bindweed, worms, flies, beetles, and roaches. They are particularly useful as acaricides for the control of mites and ticks.

The compounds of the present invention are prepared by reacting together tricyclohexyltin hydride and benzenethiol or chlorobenzenethiol. An inert, liquid reaction medium can be employed, if desired. Suitable media include toluene, hexane, and the like. The reaction proceeds smoothly at temperatures at which hydrogen is evolved and conveniently at from about room temperature to about 150° C. Generally, the temperature of the reaction ranges from slightly more than room temperature up to about 100° C. or more.

In the contacting and reacting of tricyclohexyltin hydride with benzenethiol or chlorobenzenethiol to prepare the products hereof, the reaction consumes the two reactants in a mole ratio of 1:1. Although some of the desired product is prepared by contacting the respective reactants in any molecular proportion, it is preferred to employ the requisite molecular amounts of each.

In carrying out the reaction, the tricyclohexyltin hydride and benzenethiol or chlorobenzenethiol are contacted with one another in liquid reaction medium, if employed, in any convenient order and manner. The ensuing reaction is allowed to proceed within the given temperature range for a period of time sufficient for its completion. The extent of reaction can be monitored by the evolution of hydrogen, it being substantially complete when such evolution is no longer apparent. Upon completion of the reaction, the reaction mixture is conventionally processed to recover and purify, if desired, the product. Such process includes, for example, filtration, decantation, recrystallization and chromatography.

The following examples illustrate the present invention but are not to be construed as limiting same.

EXAMPLE 1

Phenylthiotricyclohexyltin

A mixture of 3.69 grams (0.0100 mole) of tricyclohexyltin hydride and 1.1 grams (0.010 mole) of benzenethiol are mixed together with stirring over a 10 minute period at room temperature. The mixture is then heated to 100° C. and maintain thereat for 24 hours. The reaction mass is then fractionally distilled to obtain the phenylthiotricyclohexyltin product as an oil boiling at from 198°–201° C. at 0.05 millimeter Hg pressure.

EXAMPLE 2

4-chlorophenylthiotricyclohexyltin 4-chlorobenzenethiol (1.4 grams; 0.010 mole) and 3.69 grams (0.0100 mole) of tricyclohexyltin hydride are mixed together at room temperature. The mixing is accomplished with stirring in about 5 minutes. The mixture is then heated for 24 hours at a temperature of 100° C. During this period, an evolution of hydrogen occurs. At the end of the heating period, the reaction mass is fractionally distilled to obtain the 4-chlorophenylthiotricyclohexyltin product as an oil boiling at from 215°–218° C. at 0.05 millimeter Hg pressure.

In accordance with the foregoing procedures, the following are prepared.

2,4 - dichlorophenylthiotricyclohexyltin (molecular weight 534.2) by reacting together 2,4-dichlorobenzenethiol and tricyclohexyltin hydride.

2-chlorophenylthiotricyclohexyltin (molecular weight 499.7) by reacting together 2-chlorobenzenethiol and tricyclohexyltin hydride.

2,4,5 - trichlorophenylthiocyclohexyltin (molecular weight 568.7) by reacting together 2,4,5-trichlorobenzenethiol and tricyclohexyltin hydride.

The compounds of the present invention are useful as pesticides for the control of a wide variety of household and agricultural pests such as arachnid, fungal, plant and insect pests, for example, mites, ticks, *Bacillus subtilis*, bread mold fungus, pigweeds, Daphnia, worms, and flies. For such use, the unmodified compounds can be employed. Alternatively, the compounds can be dispersed on an inert finely divided solid to prepare dust compositions. The latter dust compositions can be dispersed in water with or without the aid of a wetting agent and the resulting aqueous dispersions employed as sprays. In other procedures, the compounds can be employed as a constituent in edible oils or in other oils or solvents, or as a constituent in solvent-in-water or water-in-solvent emulsions or dispersions which can be employed as sprays, drenches or washes. Good results are obtained with methods employing and compositions containing pesticidal amounts of one or more of the compounds hereof. Generally, these amounts range from about 0.5 to about 5000 parts per million of one or more of the compounds.

In representative operations, each of phenylthiotricyclohexyltin and 4-chlorophenylthiotricyclohexyltin gives complete controls and kills of two-spotted spider mites when the latter are separately contacted with compositions containing, as the sole toxicant, one of the named compounds at a concentration of 500 parts per million by weight.

In further representative operations, phenylthiotricyclohexyltin and 4-chlorophenylthiotricyclohexyltin give substantially complete controls and kills of *Staphylococcus aureus*, when each are separately employed as the sole toxicant in aqueous compositions at concentrations of 500 parts per million by weight.

The starting compounds hereof are prepared via known methods. Tricyclohexyltin hydride can be prepared by reducing tricyclohexyltin chloride with lithium aluminum hydride, preferably in organic reaction medium and at temperatures of from about minus 10° C. to about 110° C.

What is claimed is:
1. Chlorophenylthiotricyclohexyltin compounds corresponding to the formula:

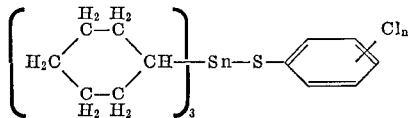

where $n$ is the integer 1, 2, 3, 4, or 5.

References Cited
UNITED STATES PATENTS 3,015,644    1/1962    Leistner et al. ____ 260—429.7X
3,264,177    8/1966    Kenaga _____ 260—429.7X JAMES E. POER, Primary Examiner
W. F. W. BELLAMY, Assistant Examiner U.S. Cl. X.R.
71—97; 424—288